United States Patent

[11] 3,604,555

[72] Inventor Gerald Cowper
 65, Holmrock Rd., Carlisle, England
[21] Appl. No. 839,952
[22] Filed July 8, 1969
[45] Patented Sept. 14, 1971
[32] Priority July 15, 1968
[33] Great Britain
[31] 33,566/68

[54] VIBRATORY CONVEYOR
 14 Claims, 5 Drawing Figs.

[52] U.S. Cl. .................................................. 198/220 DB,
 198/220 BA, 209/367
[51] Int. Cl. .................................................. B65g 27/00
[50] Field of Search .......................................... 198/220 B,
 220 D; 209/367, 366.5

[56] References Cited
 UNITED STATES PATENTS
 3,053,379 9/1962 Roder et al. .................. 198/220
 3,053,380 9/1962 Spurlin .......................... 209/367 X Primary Examiner—Richard E. Aegerter
Assistant Examiner—Douglas D. Watts
Attorney—Jones and Lockwood ABSTRACT: A conveyor for particular materials such as chemicals, minerals and foodstuffs, is made form one or more units which extend longitudinally with a conveying surface disposed to one or both sides of a structural member in a direction substantially parallel to the longitudinal direction of the member.

Means are provided to convey a helical reciprocating movement to the units about an axis lying in the longitudinal direction of the structural member and this may effectively be provided by means of vibrator motors with out-of-balance loading. Conveyors with two conveying surfaces can thus be used to convey materials in two directions as the movement on one surface will be in a forwards direction and that on the other surface will be in a backwards direction.

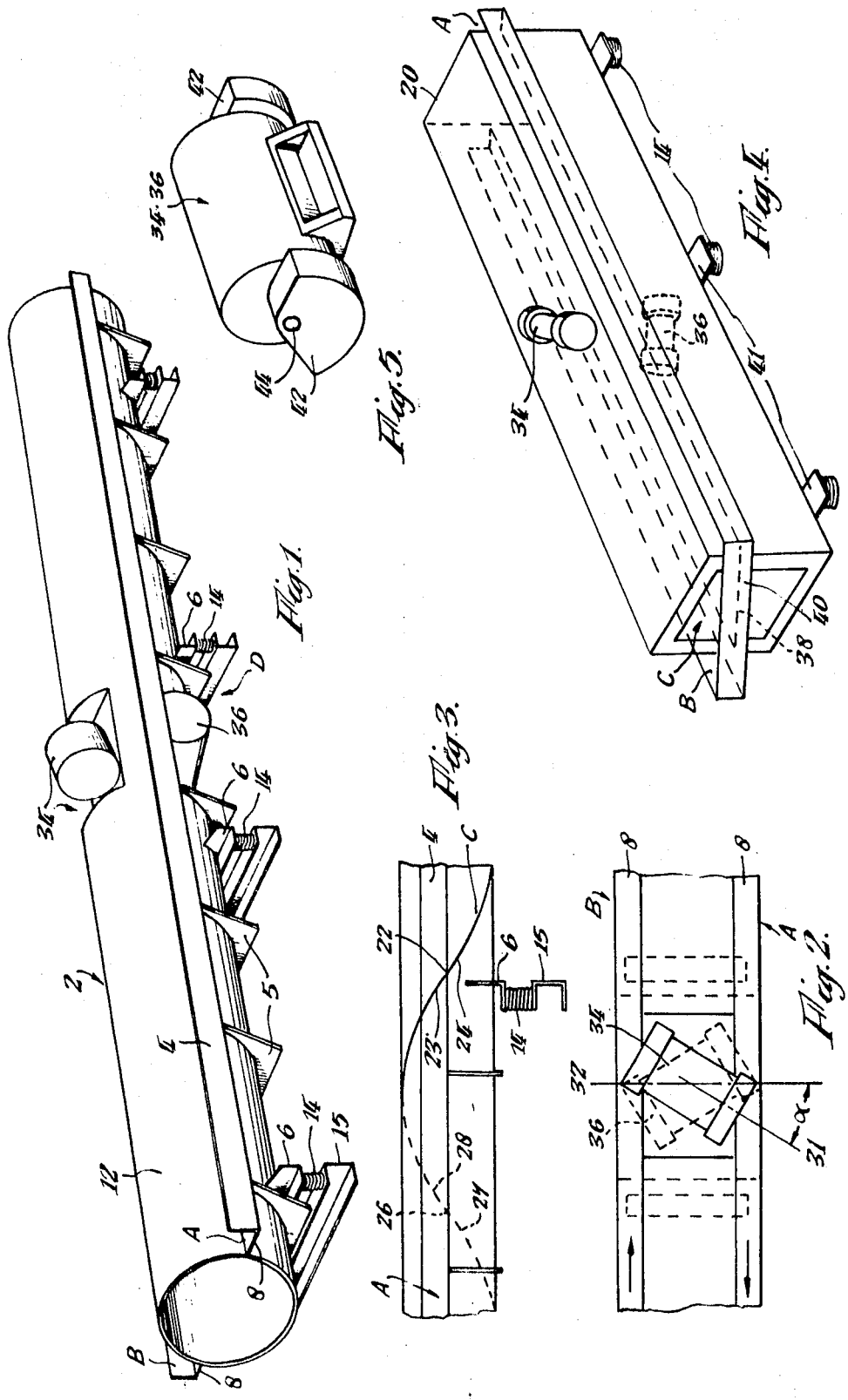

3,604,555

VIBRATORY CONVEYOR

BACKGROUND OF THE INVENTION

Vibratory conveyors are known which consist of a number of relatively short units each of which units is spring mounted and provided with one or more vibrator motors, which by reason of out-of-balance loading on their rotor shafts, or by other alternative means, cause the conveyor units to describe a substantially linear reciprocating movement at an angle to the length of the unit, i.e. the direction in which it is intended that material should be conveyed. This causes the material being conveyed to move along the unit in a series of jumps. Such a conveyor is subject to the disadvantage that only short length units can be employed, unless leaf springs or other similar supports are used, as otherwise the structure is subject to bending stresses, produced by the linear reciprocating movement.

SUMMARY OF THE DESCRIPTION

According to this invention I provide a conveyor comprising one or more units each unit having a longitudinally extending member with a conveying surface extending along one or each side of the member in a direction substantially parallel to the longitudinal direction of the member and actuating means for reciprocating the member in a substantially helical path about an axis lying in the longitudinal direction of the member. Conveniently, the actuating means comprises a pair of vibrator motors with out-of-balance loading mounted on opposite sides of said member so that the member lies between the motors. The motor axes are angled in opposite senses but to the same degree with respect to a plane perpendicular to the longitudinal direction of the member in order to produce a helical couple. The motors may be mounted at the same level above the ground with the member between them, or one motor may be above and one below the member.

Preferably, the unit is mounted on resilient support means which may take the form of coil springs mounted below the said unit. Preferably the longitudinally extending member is circular or rectangular in cross section.

BRIEF DESCRIPTION OF THE DRAWINGS

The invention will now be further described with reference to the accompanying drawings wherein:

FIG. 1 is a perspective view of one form of conveyor unit according to the invention;

FIG. 2 is a part plan view;

FIG. 3 is a part elevation, illustrating the direction of movement of the unit;

FIG. 4 shows in perspective a modified form of unit; and

FIG. 5 shows one form of known reciprocating means without the protective casings for the sector weights.

DESCRIPTION OF THE PREFERRED EMBODIMENTS

A conveyor may be made up of one or more units of the kind shown in FIGS. 1 to 3. The unit, generally indicated by the reference numeral 2, has a longitudinally extending cylindrical structural member 12 of circular cross section to which are secured, one on each side, troughs marked A and B respectively, each trough having a conveying surface 8, upon which material to be conveyed is disposed and a sidewall 4. The troughs A and B are supported by ribs 5 located at intervals along the structural member 12. The whole unit 2 is supported by means of coil springs secured to struts 6 of L-shaped cross section underneath the unit. In the drawings these springs 14 are shown as mounted on supports 15, but they could equally be mounted on the floor. Alternatively the unit may be resiliently suspended from above.

The member 12 is provided with means which can convey to it a series of helical oscillations. As shown in FIG. 1 the generally cylindrical form of the member 12 is interrupted by the provision of a flat horizontal surface 30 on which is rigidly mounted a vibrator motor 34, the axis 31 of the motor being inclined at an angle $\alpha$ to a plane 32 normal to the axis of the cylindrical member 12, as shown in FIG. 2. A similar flat mounting surface on the underside of the instrument, which cannot be seen in FIG. 1, is used for mounting similarly a vibrator motor 36, the axis of which is also at an angle $\alpha$ to the plane 32 and $2\alpha$ to the axis of the motor 34. In the drawing the angle $\alpha$ is shown as about 30°.

The vibrator motors 34 and 36 are of a type known in the art, and each comprises, as shown in FIG. 5, two sector weights 42 fixed on the ends of the driven shaft 44 of the electric motor which is mounted between the weights. The two vibrator motors 34 and 36 are driven at the same speed but are not interconnected; the motors are rotated in opposite senses as viewed from the side of the unit 2. Thus, for example, as viewed from the direction of the arrow D in FIG. 1, the motor 34 may be set to rotate counterclockwise and the motor 36 to rotate clockwise. It is known that in these circumstances the two motors synchronize to produce a helical movement.

FIG. 3 shows the movement of the conveyor unit. Round the member 12 there has been described an imaginary helical path C indicating the reciprocatory movement of the conveyor. From the position shown, the point 22 on trough A of the conveyor unit in its level position reciprocates along the line 23–24, whilst the similar point 26 on the other side (trough B) of the unit reciprocates on the line 27–28. In these conditions material on the conveying surface 8 of trough A will move in a series of small jumps, in the direction from right to left as shown in FIG. 2, while material on trough B will similarly move in the opposite direction; the directions of movement of the material is shown by the arrows in FIG. 2.

It is not of course necessary that troughs be provided on both sides of the conveyor unit, and indeed for many applications it is sufficient to have a trough on one side only. The trough or troughs may be made removable if desired so that they can be replaced after wear has occurred or may be changed to allow of the use of different materials under different conditions.

In use, a conveyor according to the invention can be made up of any number of units such as those described. However, such units are not subject to bending stresses as in the case of conveyors of the prior art and so the units can be of considerable length without the need to use leafsprings or other means to overcome bending moments regardless of the length of the conveyor. Furthermore the conveyors shown in FIGS. 1 and 2 can be used for conveying material in two directions at the same time, for example, to and from a particular processing station. Another example of the use of such a conveyor could be the provision of an inspection conveyor where material rejected from one of the troughs of the unit could be returned to the starting point down the other trough. Alternatively, the conveyor could be employed in a system where it is desired to alter the direction of flow every so often, by diverting the material into either one of the two conveying troughs by means of a divertor door stationed above the conveyor. Such conveyors can be used for carrying materials along level surfaces or up or down slightly inclined surfaces and for such processes as screening, cooling, dewatering, cooking and blending. Materials which may be conveyed include foodstuffs, minerals, chemicals, plastic pellets, fertilizer, rubber crumb, swarf, tobacco, castings, clinker, cullet, sand and gravel, sugar and iron ore. The conveyors can be used with other attachments such as an overhead screen, adapted to allow small grade material to pass through to one side of the conveyor and direct large grade material to the other side.

In certain instances it may be required to pass material along one side of the conveyor and back along the other side without removing it from the conveyor. This may apply, for example, where treatment, e.g. drying or irradiation, can be performed on the material while moving on the conveyor, or where the material is to be subjected to visual inspection. A modification of the arrangement shown in FIG. 2 is illustrated in FIG. 4, where the structural member 20 is of square cross section. This FIGURE shows the trough A of the conveyor mounted at a higher level on the central rectangular member 20 than the trough B, the two troughs being joined across the end of the conveyor by a sloping trough C which like the troughs A and B consists of a conveying surface and a sidewall with the difference that both the conveying surface 38 of trough C and the sidewall 40 slope downwardly from trough A to trough B. The conveying surface 38 merges smoothly at one end into conveying surface 8 of trough A and at the other end into conveying surface 8 of trough B, so that material, having come to the end of trough A passes, assisted by the action of gravity, down trough C and back along trough B. In the form shown in FIG. 4 brackets 41 from the lower side of the member 20 are supported on the springs 14. If the conveyor is to be made from more than one unit, the further units will of course have troughs A and B but not trough C.

I claim:

1. A conveyor for conveying material in a substantially straight direction which is horizontal or slightly inclined to the horizontal comprising a unit having a longitudinally extending member, the longitudinal direction of which is horizontal or slightly inclined to the horizontal, resilient support means for the unit, a substantially straight conveying surface supported by and extending along one side of the member in a direction substantially parallel to the longitudinal direction of the member, and actuating means for reciprocating the member in a substantially helical motion about an axis substantially parallel to the longitudinal direction of the member, the conveying surface being laterally spaced from said axis.

2. A conveyor according to claim 1 wherein the conveying surface lies in a plane which passes through or is closely adjacent to the axis of the helical motion.

3. A conveyor according to claim 1 wherein another such conveying surface is supported by and extends along the other side of the member.

4. A conveyor according to claim 3 wherein the two conveying surfaces are at different levels, and a third conveying surface joins the two said surfaces at the end of the conveyor.

5. A conveyor according to claim 1 wherein the actuating means comprises a pair of vibrator motors with out-of-balance loading mounted on opposite sides of said member with their axes angled in opposite senses but to the same degree with respect to a plane perpendicular to the longitudinal direction of the member to produce a helical couple.

6. A conveyor according to claim 1 wherein the actuating means comprises a pair of vibrator motors with out-of-balance loading mounted on said member one above and one below the member with their axes angled in opposite senses but to the same degree with respect to a plane perpendicular to the longitudinal direction of the member.

7. A conveyor according to claim 1 wherein the resilient support means comprises a plurality of coil springs mounted at intervals below the unit.

8. A conveyor according to claim 1 wherein the conveying surface is a flat surface bounded on one side by the member and on the other side by a sidewall.

9. A conveyor according to claim 13 wherein the conveying surface is formed by a trough mounted removably along one side of the member.

10. A conveyor comprising one or more units, each unit having a longitudinally extending member with a conveying surface extending along one side of the member in a direction substantially parallel to the longitudinal direction of the member, said conveying surface being a flat surface bounded on one side by the member and on the other side by a sidewall, and actuating means for reciprocating the member in a substantially helical path about an axis lying in the longitudinal direction of the member.

11. A conveyor according to claim 10 wherein there are provided two such conveying surfaces, one on each side of the longitudinally extending member.

12. Conveying apparatus comprising one or more conveyor units, each of which units comprises
    a. a longitudinally extending structural member the longitudinal direction of which is horizontal or slightly inclined to the horizontal,
    b. a substantially straight conveying surface extending along one side of the member in a direction substantially parallel to the longitudinal direction of the member,
    c. a pair of vibrator motors with out-of-balance loading mounted on said member with said member therebetween, the vibrator motors being oriented with their axes angled in opposite senses but to the same degree with respect to a plane perpendicular to the longitudinal direction of the member the motors being able to reciprocate the member in a substantially helical motion about an axis substantially parallel to the longitudinal direction of the member, the conveying surface being laterally spaced from the said axis, and
    d. resilient support means for the unit.

13. Apparatus according to claim 12 wherein said conveying surface is a flat surface bounded on one side by the member and on the other side by a sidewall.

14. Apparatus according to claim 13 wherein there are two such conveying surfaces one on each side of the structural member.